United States Patent [19]

Cutore

[11] Patent Number: 4,981,272
[45] Date of Patent: Jan. 1, 1991

[54] FUEL DELIVERY SYSTEM CAPABLE OF BEING DRAWN OUT AND LOWERED INTENDED TO BE USED ON AIRPLANE REFUELLING VEHICLES

[76] Inventor: Gaetano Cutore, c/o Sift - Casella Postale 72, Montecompatri (Roma), Italy

[21] Appl. No.: 385,217

[22] Filed: Jul. 25, 1989

[30] Foreign Application Priority Data

Jul. 28, 1988 [IT] Italy ................. 48246 A/88

[51] Int. Cl.$^5$ ........................... B64D 37 A/00
[52] U.S. Cl. ..................... 244/135 A; 244/135 R; 137/355.12; 137/899.3; 222/610; 280/838
[58] Field of Search ........... 244/135 A, 135 R; 137/355.12, 899.1, 899.3, 355.16, 355.26; 280/838, 837; 141/387, 392; 222/609, 610

[56] References Cited

U.S. PATENT DOCUMENTS

| | | | |
|---|---|---|---|
| Re. H297 | 7/1987 | Schultz .................. | 244/135 A |
| 2,735,717 | 2/1956 | Harman .................. | 244/135 A |
| 3,807,437 | 4/1974 | Leatel ................... | 137/355.12 |
| 4,269,240 | 5/1981 | Cutore .................. | 244/135 R |
| 4,534,384 | 8/1985 | Graham et al. .......... | 244/135 A |
| 4,540,144 | 9/1985 | Perrella ................ | 244/135 A |

Primary Examiner—Joseph F. Peters, Jr.
Assistant Examiner—Christopher P. Ellis
Attorney, Agent, or Firm—DeLio & Associates

[57] ABSTRACT

A fuel delivery system for refuelling airplanes comprising a delivery station mounted on an airplane refuelling tank-vehicle and movable from a rest position wherein it is completely received within a suitable, practically inaccessible housing formed on the tank to an operative position wherein it is completely outside the housing and perfectly accessible to the operator who is carrying out the refuelling, operation; the supporting frame of the system, which is of a simple and solid construction is controlled to move from the one position to the other preferably through hydraulic mechanical means.

6 Claims, 3 Drawing Sheets

FUEL DELIVERY SYSTEM CAPABLE OF BEING DRAWN OUT AND LOWERED INTENDED TO BE USED ON AIRPLANE REFUELLING VEHICLES

This invention refers to a fuel delivery system for refuelling airplanes comprising a delivery station mounted on an airplane refuelling tank-vehicle and movable from a rest position wherein it is completely received within a suitable, practically inaccessible, housing formed on the tank to an operative position wherein it is completely outside the housing and perfectly accessible to the operator who is carrying out the refuelling, operation; the supporting frame of the system, which is of simple and solid construction, is controlled to move from the one position to the other preferably through hydraulic mechanical means.

The delivery system of the invention substantially comprises a frame provided with rails for supporting the delivery station which comprises the traditional fuel delivery and control means such as hoses and winding reels, meters, filtering and safety devices and the like. The frame can be drawn out of its protective housing, which housing is preferably placed on the back of the vehicle, sliding on downwardly inclined guides to a lowered position outside the vehicle, by means of a preferably oleodynamic mechanical control.

In the lowered position all the members of the system are easily accessible to the operator and accordingly the system is more suitable to carry out the fuel delivery as well as the maintenance and repair operations, the system remaining, hydraulically connected to the tank mounted on the vehicle through telescopically extendible pipes, in all circumstances.

It is known that the fuel trucks used at present to movably carry out the refuelling of airplanes usually comprises a fuel tank containing the fuel to be delivered as well as the indispensable delivery system or station; the latter comprising all the members, instruments and devices necessary to carry out this operation that requires particular and continuous attention and controls.

It is also known that at present such delivery systems are normally mounted on the vehicle either between the driver's cab and the fuel tank or on the back of the vehicle, behind the fuel tank carried thereby. However, the above-mentioned installations cause many problems to the operator upon refuelling or carrying out maintenance of the delivery system.

When the delivery station is mounted between the driver's cab and the fuel tank, for example, the following operative problems are encountered.

(1) Since the control panels of the delivery station can be reached only from one side of the vehicle, the operator can see directly the airplane to be refuelled only if this airplane is parked on a parking area facing the side of the refuelling vehicle showing the control panel;

(2) Since the delivery hose can be drawn out only form one side of the vehicle, the path of the connection thereof to the airplane fuel tank will be rectilinear and under the control of the operator only if the airplane is parked in a parking area facing the side of the refuelling vehicle showing the control panel, wherein the hose outlet is placed.

(3) Since the members of the delivery system are received within a housing closed at one side by the driver's cab and at the opposite side by the fuel tank these members are not easily accessible for overhauling, repairs and maintenance (replacement of filtering members, overhauling and repair of sealing members, overhauling and repair of sealing members, pipes automatic members, valves and the like). Furthermore, all the members are usually placed at a very high level with respect to the operator.

In case the delivery station is mounted on the back of the vehicle, behind the fuel tank, the following operative difficulties are encountered:

(1) The operator is forced to remain near the back side of the vehicle since the control panel is placed within the housing containing the delivery station, accordingly he can see directly the airplane to be refuelled only in case the latter is parked on a parking area the facing back side of the vehicle;

(2) the connection of the delivery hoses to the airplane fuel tank will be rectilinear and visible by the operator only in case the airplane to be refuelled is parked on an parking are facing the back side of the vehicle;

(3) the members of the delivery station are generally placed at a too high level with respect to the operator, thus making it difficult to overhaul the station for maintenance and repairs (replacement of filtering members, overhauling and repair of pipes, valves, sealing members, automatic members and the like).

In other words, the fuel trucks used at present for refuelling airplanes force the operator to work in bad conditions and the delivery hoses to follow non rectilinear and accordingly longer paths when the movable refuelling station is connected to the airplane to be refuelled.

In view of the foregoing, the optimal conditions would be as follows:

(a) the operator effecting the refuelling operation should be able to see simultaneously the airplane to be refuelled, the control panel, the members and accessories of the delivery station;

(b) the operator of the maintenance and repairs should be able to see directly the components and accessories of the delivery system and have the best access thereto;

(c) the hose path should be rectilinear between the airplane refuelling station and the airplane to be refuelled.

Accordingly, this invention is intended to overcome the above-mentioned drawbacks providing a refuelling system or station movable between a raised, rest position and a lowered, operative position, wherein the movement to the lowered, operative position of the system also causes the system to get out of the receiving and protecting housing.

In the lower position, the operator can simultaneously see the control panel and all the other members of the refuelling station still having a direct view of the airplane, even if the latter is parked at either the right or left side of the airplane refuelling vehicle, or behind the operator's shoulders; furthermore, the lowering and coming out displacement of the refuelling station facilitate the controls and maintenance of the members and accessories thereof as well as any possible integral replacement thereof in case of a serious failure of the system. Furthermore, the rotational axis of the delivery hose winding reel is not horizontal, accordingly the hose path is rectilinear when the refuelling station is connected to airplanes parked either at the right or at the left side or at the back side with respect to the refuelling vehicle. Finally, the elliptical back closing door is important since it protects the members and accessories of the refuelling station when it is closed and the vehicle is moving and parking and becomes a protective roof for the station and the operator during refuelling as well as a support of the light systems lighting the refuelling station during operations at night.

The invention will be now described in detail with reference to the annexed drawings, wherein.

Figure 1:
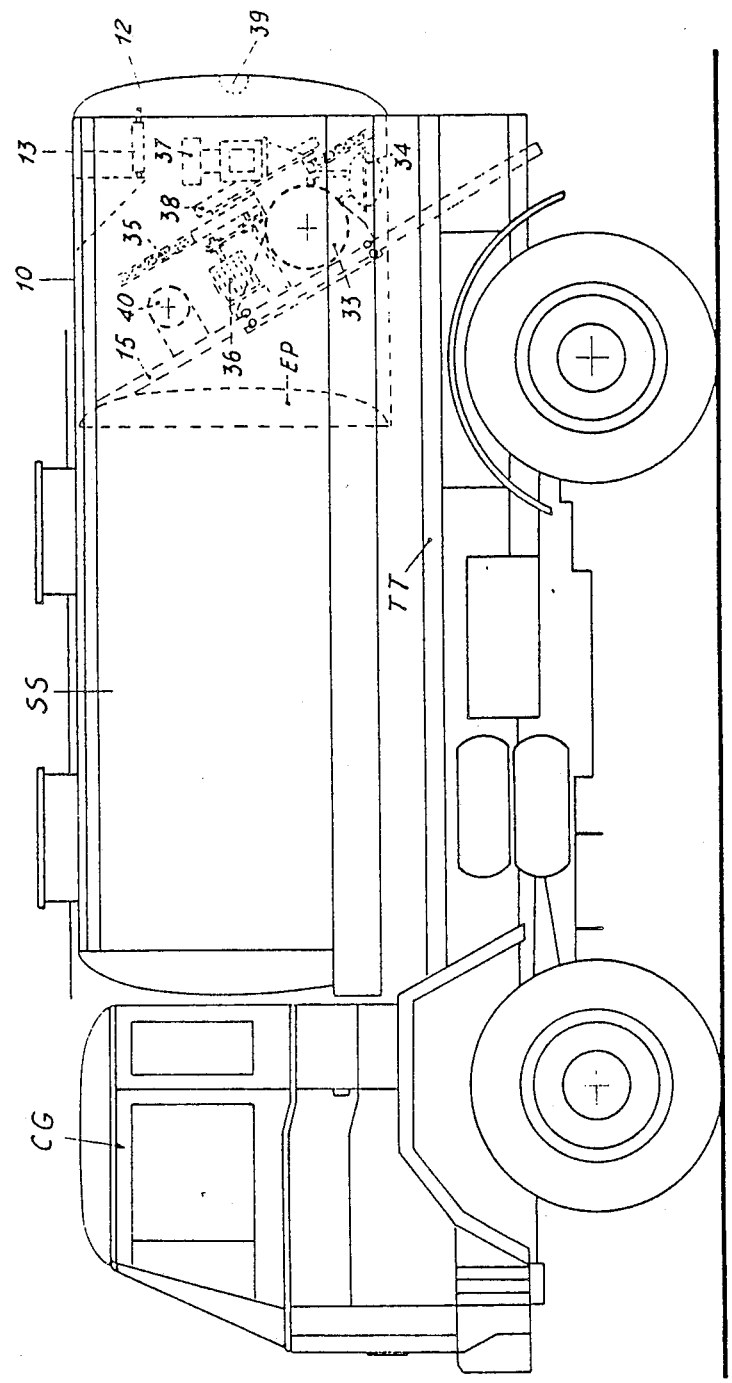
FIG. 1 is a side elevational view of a movable airplane refuelling station according to the invention, showing the delivery system in the retracted and protected position taken when the vehicle is moving and/or parking.
Figure 3:
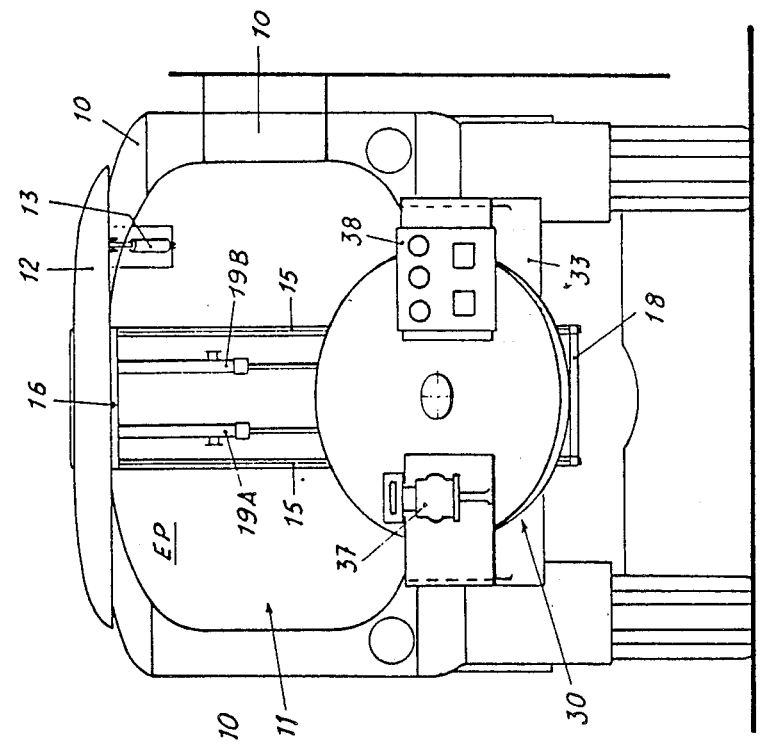
FIG. 3 is a rear view of the airplane refuelling station in the same conditions of FIG. 2.
Figure 2:
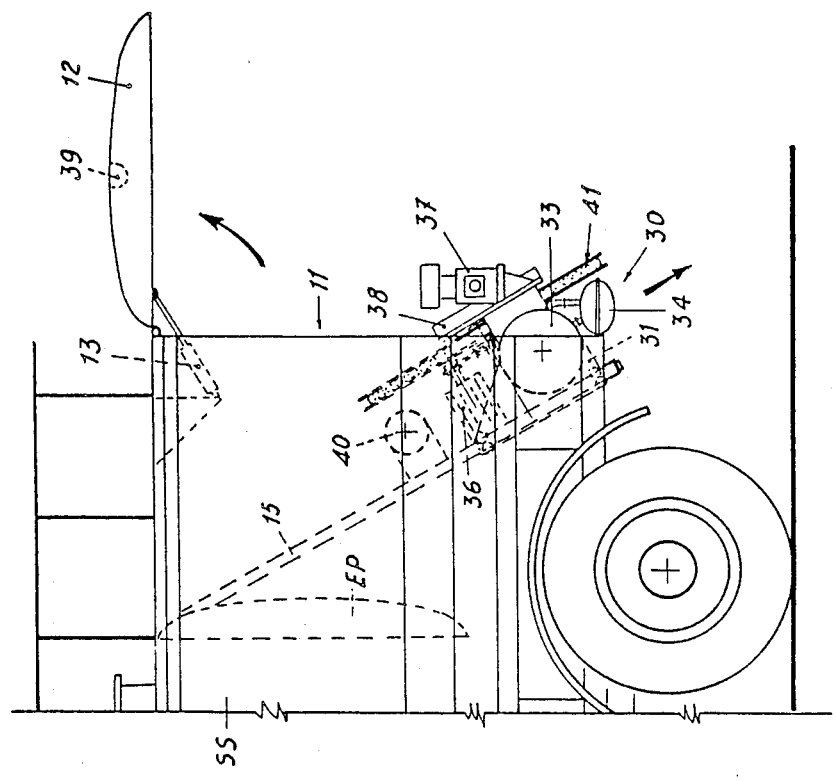
FIG. 2 is a side view similar to FIG. 1 showing the delivery system in the carring out and lowering step that follows the lifting of the elliptical rear closing door.
Figure 4:
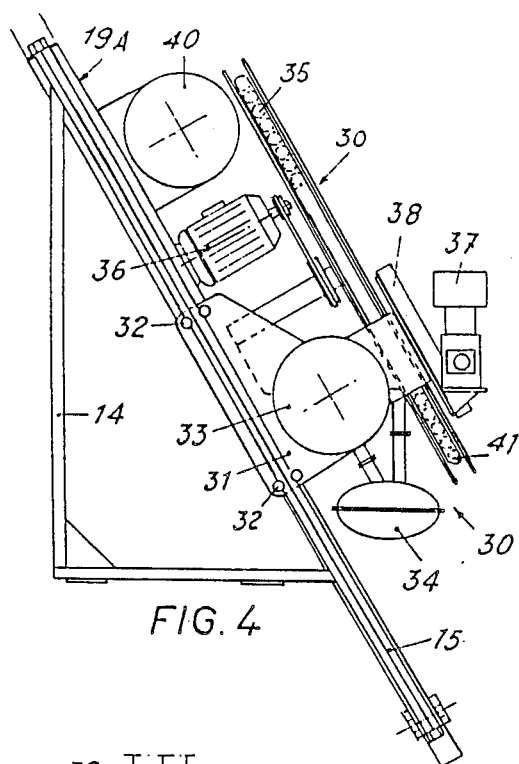
FIG. 4 is a fragmentary view showing the particular of the slide frame supporting the system.

First referring to FIGS. 1 and 2 a "fuel truck" is shown therein, that is a fuel tank intended to refuel airplanes, comprising the system or station according to the invention.

The fuel truck of the invention substantially comprises a chassis TT; a driver's cab CG and a tank SS containing the fuel.

As it is shown, chassis TT extends backwardly beyond the rear end EP of tank SS which in turn extends upwardly and sidewardly to form a rearward and downward open "chamber" or room, as shown by reference number 10.

The rear opening of chamber 11 is closed by a door 12 having a substantially oval shape. Door 12 is moved by a jack 13 from a "station at rest" lowered, closed position (FIG. 1) to a "station in use" raised open position (FIG. 2).

Figure 5:
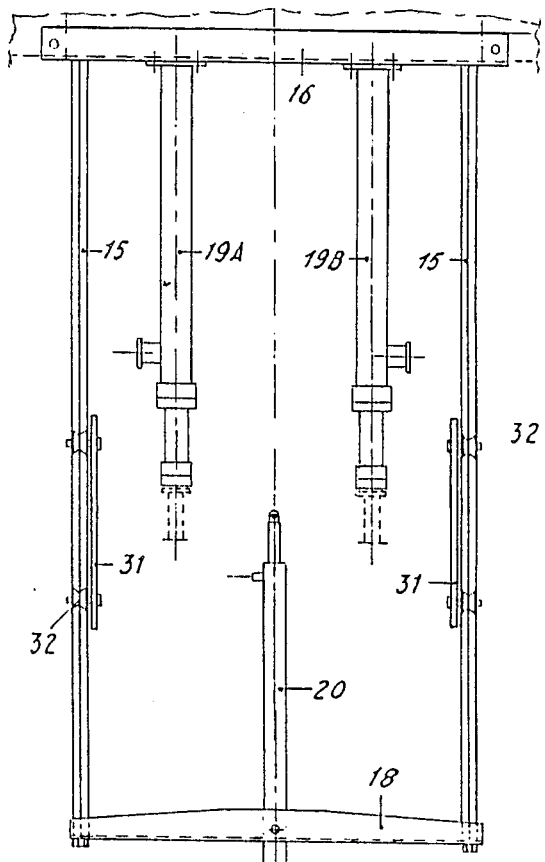
FIG. 5 is a fragmentary view showing the rails, the connecting telescopic pipes and the oleodynamic cylinder controlling the movement of the system.

A square frame 14 is placed within chamber 11 and two sloping rails 15 are secured thereto (FIG. 5).

The refuelling system or station, as it is shown, is slidably mounted on rails 15 thus moving from a raised position wherein it is completely received within chamber 11 to a lowered position wherein it partially protrudes therefrom.

A top joist 16 and a bottom joist 18 are mounted on rails 15 which joists support both telescopic pipes 19A, 19B feeding and delivering. The fuel of tank SS and the oleodynamic unit or hydraulic jack 20 controlling the system movements (FIG. 5).

The refuelling station referred to as a whole by reference number 30 is a unit comprising supporting elements, such as bearing brackets or slide 31 each provided with four wheels 32, and operative supporting members such as the big cylindrical body of filter 33, the "aquastop" device 34, the big single coil reel 35 and the like.

It should be noted that single coil reel 35 is inclined and this facilitates winding and unwinding of hose 41.

Station 30 also comprises the reel moving motor 36, a meter 37, a control panel 38 also comprising the "deadman" delivery control, that, as it is known, immediately interrupts the delivery if the operator takes his hand off, and a fire extinguisher 40.

If should be noted that the two telescopic pipes which easily follow the movements of station 30 are used the one to deliver the fuel to the airplane tank and the other to carry out the opposite operation, that is discharging the fuel therefrom as it is sometimes necessary.

It is clear that the invention provides a refuelling system or station which completely overcomes the drawbacks of the traditional solutions, since the some can be lowered to the level of the operator in a comfortable and accessible position.

The control levers and knobs for lifting door 12 and raising and lowering the whole system are also at the level of the operator.

Door 12 will also be provided with a light source, referred to by reference number 39, to facilitate the operations at night.

Figure 6:
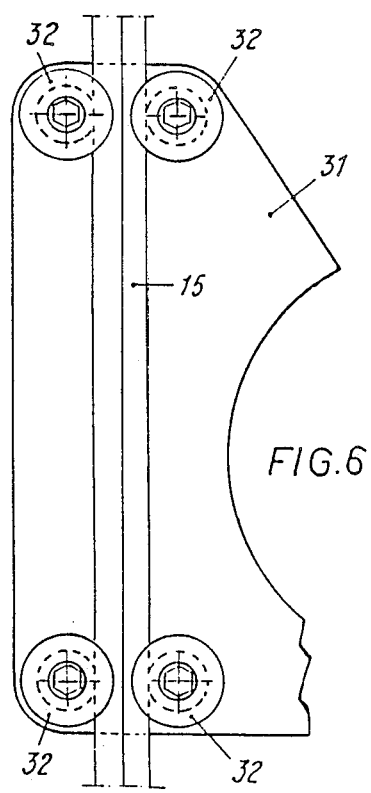
FIGS. 6, 7 and 8 show in particular the connection between the rails and the carriages.
Figure 7:
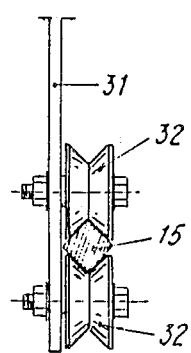
Figure 8:
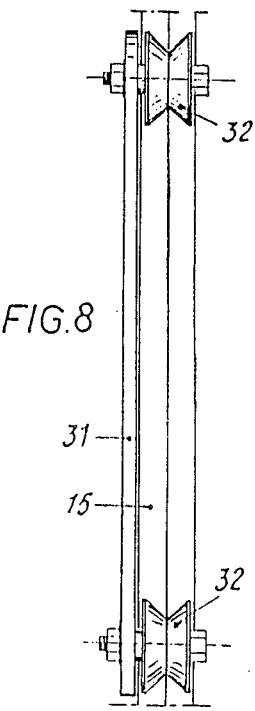

A particular feature of the station according to the invention is the shape of rails 15 having a square section and of wheels 32 having a V-shaped groove so that the matching of pairs of wheels allows the best engagement to be obtained between the wheels and the respective rail without relative slacks and movements, as it is shown in FIGS. 6, 7 and 8.

I claim:

1. A refuelling system for installation on tank vehicles having a chamber adjacent to the tank for refuelling airplanes, comprising a station having a filter, a fire extinguishing device, a single-coil reel, a meter and a control panel mounted on a support, said station being movable by mechanical means from a raised rest position wherein it is completely received within a said chamber to a lowered operative position wherein it partially protrudes from said chamber.

2. The refuelling system of claim 1, wherein a square frame is mounted on said chamber, said frame supporting two sloping rails which in turn support a top joist and a bottom joist and wherein said system further comprises two supporting brackets or slides each supporting a plurality of wheels intended to engage said rails which are structurally and functionally connected by the cylindrical body of said fuel filter, said reel and said fire extinguisher.

3. The refuelling system of claim 2, wherein said reel is a single coil reel and the axis thereof is slightly inclined with respect to a horizontal plane.

4. The refuelling system of claim 2, wherein the cross section of said rails is square shaped and each of said wheels is provided with a V-shaped groove so that each pair of matching wheels is firmly engaged with the respective rail.

5. The refuelling system of claim 1 wherein the back side of said chamber is closed by an elliptical door movable from a lowered close position to a raised open position and provided with a lighting unit placed on the inner side thereof.

6. A vehicle having a system for refuelling airplanes comprising:
a fuel tank on said vehicle having a chamber adjacent to said tank;
a refuelling station comprising a filter, a fire extinguishing device, a single coil reel, a meter and a control panel mounted on a support; and
a slidable mount for moving said station from a raised rest position received within said chamber to a lowered operative position protruding from said chamber.

* * * * *